United States Patent [19]
Dimroth et al.

[11] 4,226,634
[45] Oct. 7, 1980

[54] PROCESS FOR PREPARING PIGMENT COMPOSITIONS

[75] Inventors: Peter Dimroth, Mannheim; Helmut Knittel, Ludwigsburg; August Seitz, Besigheim; Dietrich Wolff, Stuttgart, all of Fed. Rep. of Germany

[73] Assignee: BASF Farben & Fasern AG, Hamburg, Fed. Rep. of Germany

[21] Appl. No.: 5,765

[22] Filed: Jan. 23, 1979

[30] Foreign Application Priority Data

Jan. 24, 1978 [AT] Austria ................................. 517/78

[51] Int. Cl.³ .................... B02C 17/20; C09B 67/04; C09B 67/22; C09C 1/36
[52] U.S. Cl. .................... 106/288 Q; 106/299; 106/302; 106/306; 106/309; 241/22; 241/184
[58] Field of Search .................. 106/309, 299, 288 Q; 423/598; 241/22, 184

[56] References Cited

U.S. PATENT DOCUMENTS

| | | | |
|---|---|---|---|
| 1,945,809 | 2/1934 | Harbert | 106/299 X |
| 2,166,221 | 7/1939 | Patterson | 423/598 |
| 2,361,059 | 10/1944 | Robertson | 106/309 X |
| 2,581,414 | 1/1952 | Hochberg | 241/22 |
| 2,855,156 | 10/1958 | Hochberg et al. | 241/22 |
| 3,176,925 | 4/1965 | Huband et al. | 241/22 X |
| 3,196,028 | 7/1965 | Zimmerman et al. | 106/299 X |
| 3,292,944 | 12/1966 | Kiss et al. | 423/598 |
| 3,436,239 | 4/1969 | Feld | 106/299 X |
| 4,133,694 | 1/1979 | Bertorelli et al. | 106/309 X |

FOREIGN PATENT DOCUMENTS 647849  8/1964  Belgium ................................. 106/308 S

*Primary Examiner*—Helen M. McCarthy
*Attorney, Agent, or Firm*—Toren, McGeady and Stanger

[57] ABSTRACT

Pigment compositions including nickel titanium yellow or chromium titanium yellow as an inorganic component together with an organic pigment component impart better gloss and/or hiding power to organic coatings containing 10% or more of the compositions if the compositions are prepared by subjecting a suspension of the components in a liquid medium to intense shearing stresses and thereafter separating the mixed pigments from the medium.

8 Claims, No Drawings

PROCESS FOR PREPARING PIGMENT COMPOSITIONS

This invention relates to pigment compositions suitable for coloring organic coatings, and particularly to improved pigment compositions having both an organic pigment component and an inorganic pigment component.

Pigment mixtures prepared from nickel titanium yellow or chromium titanium yellow and organic pigments have well established advantages, and the two inorganic components are readily prepared at low cost from titanium dioxide and the coloring oxides of nickel and chromium. However, organic coatings containing relatively large amounts of the pigment mixtures, 10% or more, which would otherwise be valuable because of their intense coloration, show inferior gloss, sometimes combined with unexpectedly poor hiding power or weathering characteristics.

It has been found that pigment compositions containing nickel titanium yellow, chromium titanium yellow, barium nickel titanate, barium chromium titanate are capable of producing organic coatings of higher gloss, usually better hiding power, and other improved properties when the pigment compositions are prepared by subjecting a suspension of the inorganic and organic components in a liquid medium to intense shearing stresses with or without adjuvants, and by separating the pigment mixture from the liquid medium.

The suspensions may be prepared in any conventional manner by stirring the components gradually into the liquid medium, by making a slurry from a small amount of liquid and the pigments, and thereafter diluting the slurry, and the like. Water or organic liquids may constitute the liquid medium. If they are inert to the pigments employed, the organic liquids may be chosen freely. Alcohols, ketones, esters, halogenated hydrocarbons, and ethers are merely representative of the types of organic liquids which are interchangeably operative. Water is the preferred liquid medium because of its low cost, and because it can be disposed of after use without requiring the precautions unavoidable with most organic liquids. Addition agents, such as surfactants and suspending agents, are sometimes convenient to use in small amounts, but are not generally needed.

The organic pigment components employed to advantage in this invention may be chosen freely from the several classes of insoluble dyes and dye derivatives. Merely by way of example, there may be used azo dyes, such as Pigment Yellow C.I.81, C.I.16, C.I.83, Pigment Orange C.I.38, Pigment Red C.I.175, C.I.144, C.I.170; polycyclic pigments such as Pigment Yellow C.I.109, C.I.138, C.I.108, C.I.139, C.I.112, C.I.110, Pigment Orange C.I.43, Pigment Red C.I.216, C.I.149, C.I. 179, C.I.123, C.I.178, C.I.200, Pigment Violet C.I.19, C.I.23, or metal complexes such as phthalocyanines or Pigment Yellow C.I.117.

The desired results are not achieved if the inorganic and organic pigment components are suspended in a liquid medium and agitated under conditions in which the solid suspended particles are merely moved about in the liquid medium. Agitation must be carried out under conditions to develop intensive shear stresses.

Suitable apparatus for achieving the desired stresses must provide simultaneous contact of each particle with two solid surfaces which move relative to each other at high pressure, or simultaneous contact of the particles with a solid surface while moving relative to the surface under conditions which prevent particle movement away from the surface. A pigment suspension may thus be subjected to shearing stresses according to the invention by repeatedly discharging the suspension at very high velocity through orifices whose diameter is larger but of a similar order of magnitude as the pigment particles. Other suitable equipment causes the suspension to pass between two cylindrical rollers rotating in opposite directions and defining therebetween a gap of a width not much greater than the particle diameter. While such equipment is commercially available for operation on a laboratory scale, its effects can be closely approached by the use of a particulate, abrasion resistant gridning medium. A mixture of the pigments, a liquid suspending medium and a particulate grinding medium may be subjected to rapidly reciprocating motion, as on a conventional paint conditioner which is a wrist-action shaker, in a sand mill, pebble mill, ball mill, and like equipment which is preferred for use on an industrial scale.

The duration of the shearing stress treatment varies with the nature of the pigment components employed, the equipment used, the weight and size of the batch, the ratio of grinding medium to pigments to liquid, and like parameters, and optimum conditions for specific applications may have to be established in each instance by trial and error. Initial guidance for the necessary experimentation may be found hereinbelow in specific Examples.

The pigment compositions of the invention are employed to advantage in colored organic coatings, based, for example, on acrylic or melamine resins, but they may also be incorporated in synthetic resin molding compositions, particularly in thermoplastic compositions of polyvinyl chloride and polystyrene. They have been used successively as coloring ingredients in inks for printing and other purposes. They are superior to mixtures prepared from the same components by dry mixing or grinding.

The following Examples are further illustrative of this invention:

Example 1

10 g Barium nickel titanate, 10 g Pigment Yellow C.I.138, 90 g glass beads of 1 mm diameter, and 35 ml water were enclosed in a glass bottle of 100 ml capacity, and the bottle was agitated on a wrist-action shaker (Red Devil paint conditioner) at 400 cycles per minute for 20 minutes, whereby the pigments in the bottle were exposed to intensive shearing stresses between the glass beads.

The glass beads were separated from the mixed pigments on a sieve, the pigments were filtered from the liquid present and dried at 110° C. A comparison sample was prepared from the same pigments in the same manner in the absence of the water. Coating compositions were prepared from the two batches of pigments by mixing the pigments with an alkyd-melamine vehicle in an amount of 20% by weight, based on the solids content of the vehicle, and by shaking each mixture on the afore-mentioned paint conditioner for 30 minutes.

Coatings were produced under identical conditions on high-gloss carton in a wet thickness of 150μ and baked 30 minutes at 130° C. The coatings produced from the pigment mixture prepared according to the invention showed substantially better gloss than the control coating, and its hiding power was distinctly better.

EXAMPLE 2

10 g Nickel titanium yellow AMFG (Pigment Yellow C.I.53), 10 g Pigment Yellow C.I.138, 0.25 g Pigment Orange C.I.51, 90 g glass beads of 1 mm diameter, and 35 mm water in a 100 ml glass bottle were subjected to intensive shearing stresses for 20 minutes in the manner described in Example 1.

A coating was prepared from the recovered pigment and from a control sample in the manner described in the preceding Example, and the superior gloss and hiding power of the product of the invention was again observed.

EXAMPLE 3

The same or analogous advantages were achieved under the same testing conditions when other pigment mixtures with the same or other liquids were subjected to shearing stresses between glass beads in a glass bottle in the manner of Examples 1 and 2, and such pigments and liquids are listed below:

(a) 10 g Nickel titanium yellow AMFG, 10 g Pigment Yellow C.I.130, 0.2 g Pigment Orange C.I.43, 35 ml ethanol.

(b) 8 g Nickel titanium yellow AMFG, 12 g Pigment Yellow C.I.138, 0.1 g Pigment Orange C.I.43, 35 ml ethyleneglycol.

(c) 10 g Nickel titanium yellow AMFG, 10 g Pigment Yellow C.I.138, 0.4 g Pigment Orange C.I.34, 20 ml water, and 15 ml acetone.

(d) 16 g Nickel titanium yellow AMFG, 4 g Pigment Red C.I.224, 30 ml water, 5 ml ethyleneglycol.

(e) 10 g Nickel titanium yellow AMFG, 10 g Pigment Yellow C.I.138, 2 g Phthalocyanine Blue GS C.I.62, and 35 ml water.

EXAMPLE 4

10 g Permanent Yellow PGL, 10 g nickel titanium yellow AMFG, 50 ml water, and 125 ml glass beads of 3 mm diameter were treated in a 300 ml bottle on the paint conditioner for 25 minutes. The pigment mixture recovered in the afore-described manner was incorporated in commercial baking lacquer in an amount of 40%, and a coating was prepared as above. It was higher in gloss than a comparison sample containing an equivalent pigment composition prepared by dry mixing.

The same higher gloss was observed in a coated specimen prepared from a pigment mixture containing chromium titanium yellow 3 FFG (Pigment Yellow C.I.118). Analogous results were achieved with chromium titanium yellow 4 GF (Pigment Yellow C.I.118) of a different supplier. Permanent Yellow FGL could be replaced without loss of the improved gloss and hiding power by other commercial organic pigments, such as Paliotol Yellow 2140 HD, Hostaperm Yellow H4G, and Hostaperm Yellow 70.

EXAMPLE 5

The pigments of Formulas (I) to (VIII) were synthesized in a known manner, and the crude compounds originally obtained were converted to crystalline materials having particle sizes of approximately 0.05 to 1μ by heating in water or organic solvents. 10 g Batches of each crystalline pigment were mixed with 10 g chromium titanium yellow 3 FFG, 50 ml water, 125 ml glass beads of 3 mm diameter, and the mixtures were treated in 300 ml bottles on the afore-mentioned paint conditioner for 25 minutes. The pigments recovered from each mixture weighed about 20 g.

Coatings prepared therefrom in the manner described in the preceding Examples showed better gloss and/or better dispersion of the pigments than control samples mixed dry.

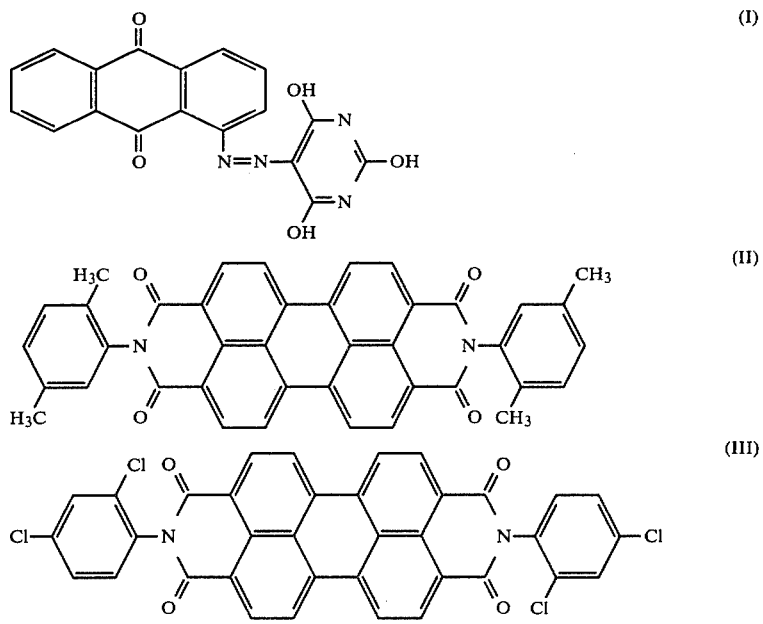

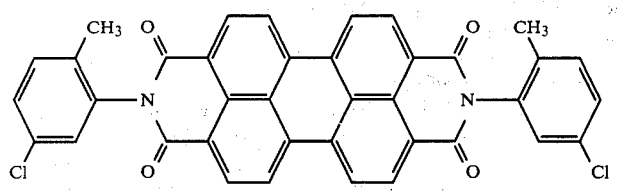
(IV)

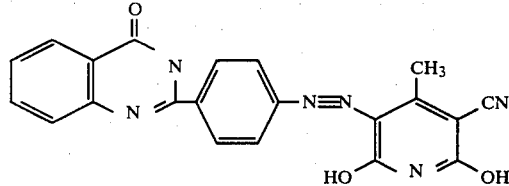
(V)

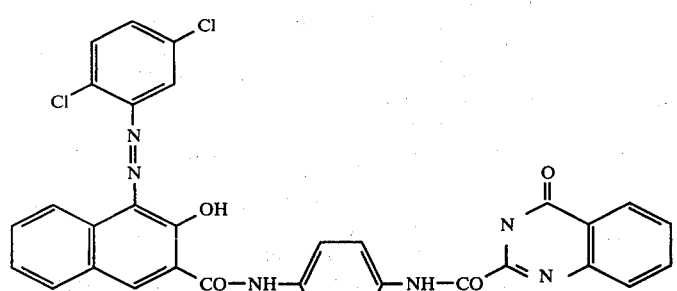
(VI)

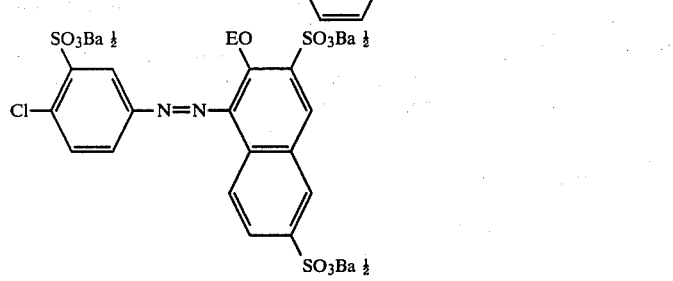
(VII)

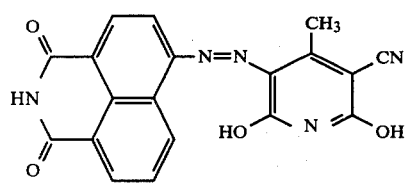
(VIII)

EXAMPLE 6

6.6 g Paliogen Red 3871 K, 13.4 g chromium titanium yellow 4 FG, 50 ml water, 0.5 g bentonite, and 120 g glass beads were shaken for 30 minutes in a bottle of 300 ml capacity. The red pigment recovered by work-up of the mixture showed better dispersion in an organic coating vehicle than an otherwise equivalent composition mixed dry. When the bentonite was omitted, sedimentation was observed during filtering of the aqueous mixture.

EXAMPLE 7

13.4 g Chromium titanium yellow 4 FG, 6.6 g Paliotol Yellow 2140 HG, 50 ml water, and 120 ml glass beads were shaken in a bottle of 300 ml capacity for 35 minutes on the paint conditioner described above. The pigment mixture recovered in the manner described showed better gloss and better hiding power in the test described in Example 1 than a comparison pigment prepared dry under otherwise identical conditions.

EXAMPLE 8

A slurry prepared from 100 g chromium titanium yellow, 100 g Pigment Red C.I.224, and 400 ml water was poured over glass beads of 1 mm diameter almost filling a laboratory beaker of 800 ml capacity, and the contents of the beaker were agitated by a rapidly rotating stirrer of O-shaped cross section for 45 minutes, thereby subjecting the pigments to high shearing stresses in the presence of the water.

A brilliantly red pigment powder was recovered as in the preceding Examples and was superior in the intensity of color imparted to a baked organic coating to an otherwise identical coating prepared from a dry mix of pigments.

EXAMPLE 9

500 g Chromium titanium yellow, 500 g Pigment Yellow C.I.138, 1.3 liters water, and 3.5 liters glass beads of 2 mm diameter were stirred for 30 minutes at 1200 r.p.m. in a ceramic-lined 5-liter vessel of a ball mill with stirrers (manufactured by Netzsch, Germany). The pigment suspension so produced was separated from the glass beads, dried at 100° C. and ground. The pigment powder so produced was superior in gloss, hiding power, color strength, and dispersion in an organic coating to an otherwise identical coating including a mixture of the pigments produced dry.

EXAMPLE 10

150 kg Chromium titanium yellow, as produced by thermal synthesis, and a filter cake of Paliotol Yellow 2140 HD containing about 40% solids and 900 liters water were charged to a porcellain-lined container of a ball mill filled with 300 kg steatite balls of 20–30 mm diameter. After 24 hours of wet grinding, the pigment suspension was subjected to fine grinding in the presence of 700 liters water in sand mill (Vollrath, Koeln, Germany, Type TSN 120) by means of Ottawa sand. A pigment suspension containing about 15% solids was recovered and dewatered on a filter press. The filter cake was dried at a temperature not exceeding 100° C. and ultimately ground in a centrifugal mill.

The product mixture so obtained was superior in the gloss and hiding power imparted to organic coatings to otherwise analogous pigment compositions produced by dry mixing and grinding.

It should be understood, of course, that the foregoing disclosure relates only to preferred embodiments, and that it is intended to cover all changes and modifications of the examples of the invention herein chosen for the purpose of the disclosure which do not constitute departures from the spirit and scope of the invention set forth in the appended claims.

What is claimed is:

1. A process for producing pigment compositions which comprises:
   (a) subjecting a suspension of an inorganic pigment component and of an organic pigment component in a liquid medium to intense shearing stresses, said inorganic pigment component being nickel titanium yellow, chromium titanium yellow, barium chromium titanate, barium nickel titanate and
   (b) recovering a mixture of said components from said medium.

2. A process as set forth in claim 1, wherein said suspension is subjected to said stresses in the presence of a particulate grinding medium.

3. A process as set forth in claim 2, wherein the abrasion resistance of said grinding medium is greater than the abrasion resistance of said components.

4. A process as set forth in claim 1, wherein said medium contains water.

5. A process as set forth in claim 4, wherein water amounts to more than 50% of said medium.

6. A process as set forth in claim 1, wherein said inorganic pigment component is chromium titanium yellow or nickel titanium yellow.

7. A process as set forth in claim 1, wherein said inorganic pigment component is nickel titanium yellow (Pigment Yellow C.I.53).

8. A process as set forth in claim 1, wherein said inorganic pigment component is chromium titanium yellow (Pigment Yellow C.I.118).

* * * * *